(12) United States Patent
Krishnan et al.

(10) Patent No.: US 11,310,504 B2
(45) Date of Patent: Apr. 19, 2022

(54) COMPLEXITY REDUCTION FOR 32-P AND 64-P LGT

(71) Applicant: TENCENT AMERICA LLC, Palo Alto, CA (US)

(72) Inventors: Madhu Peringassery Krishnan, Mountain View, CA (US); Xin Zhao, San Diego, CA (US); Shan Liu, San Diego, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/943,544

(22) Filed: Jul. 30, 2020

(65) Prior Publication Data

US 2022/0038701 A1 Feb. 3, 2022

(51) Int. Cl.
| | | |
|---|---|---|
| *H04N 19/129* | (2014.01) | |
| *H04N 19/60* | (2014.01) | |
| *H04N 19/184* | (2014.01) | |
| *G06F 17/16* | (2006.01) | |
| *H04N 19/176* | (2014.01) | |
| *H04L 65/60* | (2022.01) | |

(52) U.S. Cl.
CPC ........... *H04N 19/129* (2014.11); *G06F 17/16* (2013.01); *H04L 65/601* (2013.01); *H04L 65/607* (2013.01); *H04N 19/176* (2014.11); *H04N 19/184* (2014.11); *H04N 19/60* (2014.11)

(58) Field of Classification Search
CPC .. H04N 19/129; H04N 19/176; H04N 19/184; H04N 19/60; G06F 17/16; H04L 65/601; H04L 65/607
See application file for complete search history.

(56) References Cited

U.S. PATENT DOCUMENTS

| | | |
|---|---|---|
| 8,238,442 B2 | 8/2012 | Liu |
| 8,526,495 B2 | 9/2013 | Liu et al. |
| 8,594,189 B1 * | 11/2013 | Bankoski ............. H04N 19/174 375/240.03 |

(Continued)

OTHER PUBLICATIONS

Egilmez et al., "GBST: Separable Transforms Base on Line Graphs for Predictive Video Coding," 2016 IEEE International Conf. on Image Processing (ICIP), Sep. 25-26, 2016, pp. 2375-2379. (Year: 2016).*

(Continued)

*Primary Examiner* — Reza Aghevli
(74) *Attorney, Agent, or Firm* — Sughrue Mion, PLLC

(57) ABSTRACT

A method of coding image data performed by at least one processor, may include: receiving information regarding a data block of an image; determining whether at least one of a height or a width of a residual coding block corresponding to the data block of the image is greater than or equal to a pre-defined threshold; and based on determining that the at least one of the height or the width of the residual coding block is greater than or equal to the pre-defined threshold: identifying or generating a reduced-complexity residual coding block by reducing the number of non-zero coefficients in the residual coding block; and performing transform coding of the reduced-complexity residual coding block using a line graph transform (LGT) core to perform direct matrix multiplications for each of the horizontal and vertical dimensions of the reduced-complexity coding block.

19 Claims, 15 Drawing Sheets

(56) References Cited

U.S. PATENT DOCUMENTS

| | | | |
|---|---|---|---|
| 9,049,452 | B2 | 6/2015 | Liu et al. |
| 9,788,019 | B2 | 10/2017 | Liu et al. |
| 10,432,929 | B2 | 10/2019 | Zhao et al. |
| 10,462,486 | B1 | 10/2019 | Zhao et al. |
| 10,536,720 | B2 | 1/2020 | Zhao et al. |
| 10,567,801 | B2 | 2/2020 | Zhao et al. |
| 10,609,384 | B2 | 3/2020 | Chen et al. |
| 10,609,402 | B2 | 3/2020 | Zhao et al. |
| 2003/0031370 | A1* | 2/2003 | Andrew ............. G06T 9/007 382/233 |
| 2005/0226328 | A1* | 10/2005 | Hormis ............. H04N 19/176 375/240.12 |
| 2009/0141808 | A1 | 6/2009 | Wong |
| 2011/0080956 | A1* | 4/2011 | Zhou ............... H04N 19/61 375/240.24 |
| 2012/0163470 | A1* | 6/2012 | Wu ................. H04N 19/14 375/240.23 |
| 2015/0055697 | A1 | 2/2015 | Wu et al. |
| 2017/0150186 | A1* | 5/2017 | Zhang .............. H04N 19/625 |
| 2019/0191177 | A1* | 6/2019 | He ................. H04N 19/517 |
| 2019/0208203 | A1* | 7/2019 | Tsukuba ............ H04N 19/12 |
| 2019/0268614 | A1 | 8/2019 | Andersson et al. |
| 2021/0120270 | A1* | 4/2021 | Massimino .......... H04N 19/124 |

OTHER PUBLICATIONS

P. de Rivaz, et al., "AV1 Bitstream & Decoding Process Specification", Version 1.0.0 with Errata 1, Jan. 8, 2019 (681 pages total).

B. Bross et al., "Versatile video coding (draft 2)", Joint Video Experts Team (JVET) of ITU-T SG 16 WP 3 and ISO/IEC JTC1/SC 29/WG11, JVET-K1001 v6, Jul. 2018 (141 pages total).

F. Racape et al., "CE3-related: Wide-angle intra prediction for non-square blocks", Joint Video Experts Team (JVET) of ITU-T SG 16 WP 3 and ISO/IEC JTC 1/SC 29/WG 11, JVET-K0500 r2, 11th Meeting: Ljubljana, SI, Jul. 10-18, 2018 (7 pages total).

B. Bross et al., "CE3: Multiple reference line intra prediction (Test 1.1.1, 1.1.2, 1.1.3 and 1.1.4)", Joint Video Experts Team (JVET) of ITU-T SG 16 WP 3 and ISO/IEC JTC 1/SC 29/WG 11, JVET-L0283 v2, 12th Meeting: Macao, CN, Oct. 3-12, 2018 (7 pages total).

X. Zhao et al., "Novel Statistical Modeling, Analysis and Implementation of Rate-Distortion Estimation for H.264/AVC Coders," in IEEE Transactions on Circuits and Systems for Video Technology, vol. 20, No. 5, pp. 647-660, May 2010 (14 pages total).

B. Bross et al., "General Video Coding Technology in Responses to the Joint Call for Proposals on Video Compression with Capability beyond HEVC," in IEEE Transactions on Circuits and Systems for Video Technology, 2019, pp. 1-16, (16 pages total).

X. Zhao et al., "CE6: On 8-bit primary transform core (Test 6.1.3)," Joint Video Experts Team (JVET) of ITU-T SG 16 WP 3 and ISO/IEC JTC 1/SC 29/WG 11, JVET-L0285-r1, 12th Meeting: Macao, CN, Oct. 3-12, 2018 (18 pages total).

L. Zhao et al., "Wide Angular Intra Prediction for Versatile Video Coding," 2019 Data Compression Conference (DCC), Snowbird, UT, USA, 2019, pp. 53-62 (10 pages total).

Y.-J. Chang et al., "Intra prediction using multiple reference lines for the versatile video coding standard," Proc. SPIE 11137, Applications of Digital Image Processing XLII, 1113716, Sep. 2019 (8 pages total).

X. Zhao et al., "CE6: Fast DST-7/DCT-8 with dual implementation support (Test 6.2.3)," Joint Video Experts Team (JVET) of ITU-T SG 16 WP 3 and ISO/IEC JTC 1/SC 29/WG 11, JVET-M0497, 13th Meeting: Marrakech, MA, Jan. 9-18, 2019 (11 pages total).

X. Zhao et al., "CE6-related: Unified LFNST using block size independent kernel" Joint Video Experts Team (JVET) of ITU-T SG 16 WP 3 and ISO/IEC JTC 1/SC 29/WG 11, JVET-O539-v2, 15th Meeting: Gothenburg, SE, Jul. 3-12, 2019 (19 pages total).

S. Liu et al., "Joint temporal-spatial bit allocation for video coding with dependency," in IEEE Transactions on Circuits and Systems for Video Technology, vol. 15, No. 1, pp. 15-26, Jan. 2005 (12 pages total).

X. Zhao et al., "Joint separable and non-separable transforms for next-generation video coding," IEEE Transactions on Image Processing, vol. 27, No. 5, pp. 2514-2525, May 2018 (13 pages total).

X. Zhao et al., "Coupled Primary and Secondary Transform for Next Generation Video Coding," 2018 IEEE Visual Communications and Image Processing (VCIP), Taichung, Taiwan, 2018, pp. 1-4 (4 pages total).

Z. Zhang et al., "Fast Adaptive Multiple Transform for Versatile Video Coding," 2019 Data Compression Conference (DCC), Snowbird, UT, USA, 2019, pp. 63-72 (10 pages total).

X. Zhao et al., "Low-Complexity Intra Prediction Refinements for Video Coding," 2018 Picture Coding Symposium (PCS), San Francisco, CA, 2018, pp. 139-143 (5 pages total).

Z. Zhang et al., "Fast DST-7/DCT-8 with Dual Implementation Support for Versatile Video Coding," in IEEE Transactions on Circuits and Systems for Video Technology, 2020, pp. 1-17 (17 pages total).

X. Zhao et al., "Non-CE6: Configurable maximum transform size in VVC" Joint Video Experts Team (JVET) of ITU-T SG 16 WP 3 and ISO/IEC JTC 1/SC 29/WG 11, JVET-O545-v2, 15th Meeting: Gothenburg, SE, Jul. 3-12, 2019 (6 pages total).

H. E. Egilmez et al., "Graph-based transforms for video coding," CoRR, vol. abs/arXiv:1909.00952, 2019, pp. 1-12 https://arxiv.org/abs/1909.00952 (12 pages total).

International Search Report dated Aug. 16, 2021 in Application No. PCT/US2021/031942.

Written Opinion of the International Searching Authority dated Aug. 16, 2021 in Application No. PCT/US2021/031942.

\* cited by examiner

Table 1: AV1 primary transform basis functions (DCT-2, DST-4 and DST-7 for N-point input).

| Transform Type | Basis function $T_i(j)$, $i,j=0, 1, \ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br><br>where $\omega_0 = \begin{cases} \sqrt{\dfrac{2}{N}} & i=0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 5A

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓, DCT → | ✓ (block size ≤ 16×16) | (block size ≤ 16×16) |
| DCT_ADST | DCT ↓, ADST → | | |
| ADST_ADST | ADST ↓ and → | | |
| FLIPADST_DCT | FLIPADST ↓, DCT → | ✗ | (block size ≤ 16×16) |
| DCT_FLIPADST | DCT ↓, FLIPADST → | | |
| FLIPADST_FLIPADST | FLIPADST ↓ and → | | |
| ADST_FLIPADST | ADST ↓, FLIPADST → | | |
| FLIPADST_ADST | FLIPADST ↓, ADST → | | |
| IDTX | IDTX ↓ and → | ✓ (block size ≤ 16×16) | (block size ≤ 32×32) |
| V_DCT | DCT ↓, IDTX → | ✓ (block size ≤ 16×16) | (block size ≤ 16×16) |
| H_DCT | IDTX ↓, DCT → | | |
| V_ADST | ADST ↓, IDTX → | ✗ | (block size ≤ 16×16) |
| H_ADST | IDTX ↓, ADST → | | |
| V_FLIPADST | FLIPADST ↓, IDTX → | ✗ | (block size ≤ 16×16) |
| H_FLIPADST | IDTX ↓, FLIPADST → | | |

Table 2: AV1 hybrid transform kernels and their availability based on prediction modes and block sizes.

FIG. 5B

Generic LGT characterized by self-loop weights $v_{c1}$, $v_{c2}$ and edge weights $w_c$ $$L_c = \begin{bmatrix} w_c + v_{c1} & -w_c & & & & 0 \\ -w_c & 2w_c & -w_c & & & \\ & -w_c & 2w_c & \cdots & & \\ & & & \cdots & -w_c & \\ & & & -w_c & 2w_c & -w_c \\ 0 & & & & -w_c & w_c + v_{c2} \end{bmatrix} \quad \text{for } w_c > 0$$

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

4x4 Input Block $X$

FIG. 5E

An MxN Coding Block

| M (block width) | N (block height) | Multiplications per coefficient |
|---|---|---|
| 16 | 16 | 32 |
| 16 | 32 | 48 |
| 32 | 16 | 48 |
| 32 | 32 | 64 |
| 16 | 64 | 80 |
| 64 | 16 | 80 |
| 32 | 64 | 96 |
| 64 | 32 | 96 |
| 64 | 64 | 128 |

Table 3: Multiplications per coefficient required for transform coding a block of size M×N

FIG. 6B

| M (block width) | N (block height) | m (subblock width) | n (subblock height) |
|---|---|---|---|
| 16 | 32 | 16 | 16 |
| 32 | 16 | 16 | 16 |
| 32 | 32 | 16 | 16 |
| 16 | 64 | 16 | 16 |
| 64 | 16 | 16 | 16 |
| 32 | 64 | 16 | 16 |
| 64 | 32 | 16 | 16 |
| 64 | 64 | 16 | 16 |

Table 4:

A pre-defined table that associates coding blocks of size M×N with subblocks of size m×n, where all coefficients outside the m×n region are zeroed-out.

FIG. 8

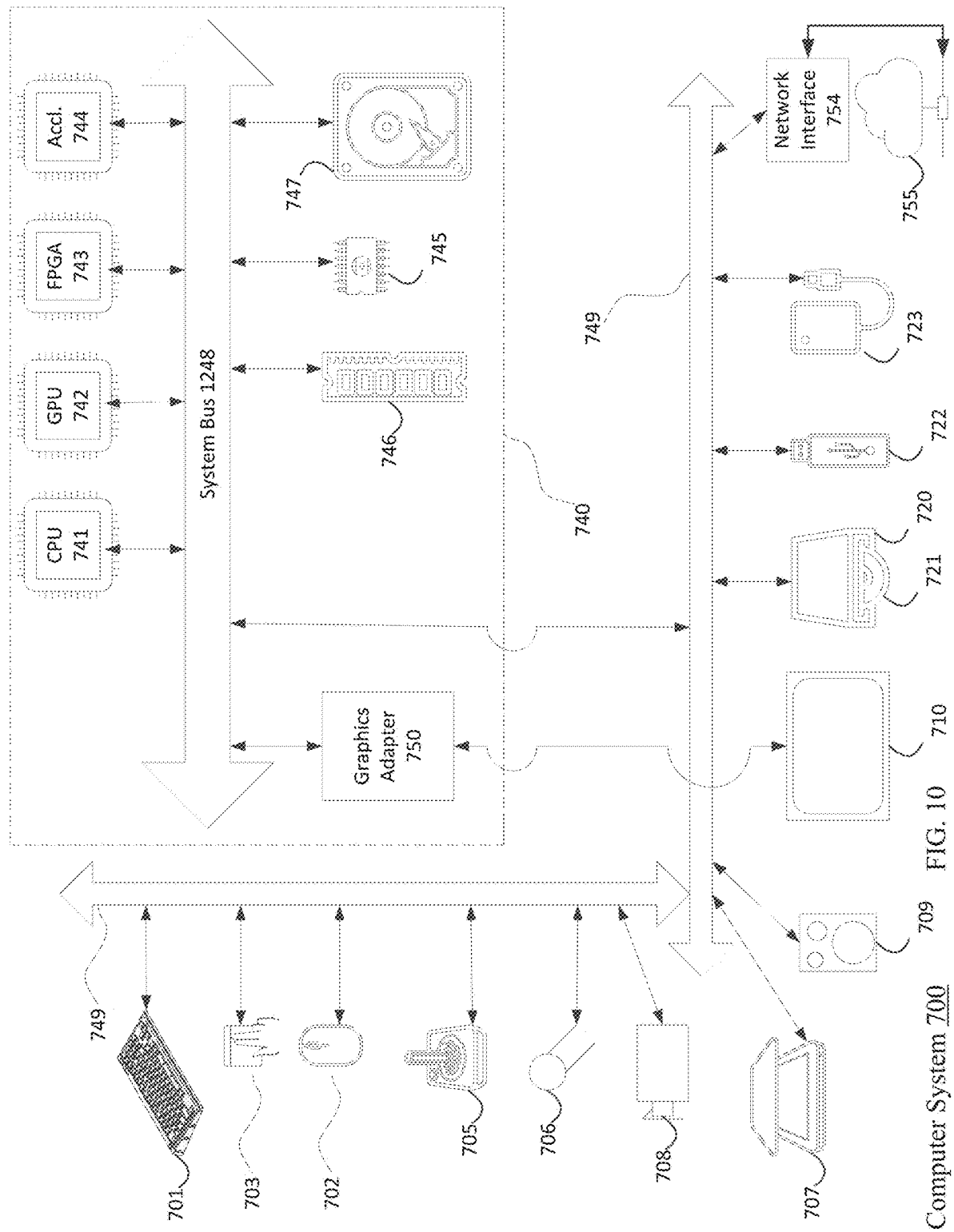

COMPLEXITY REDUCTION FOR 32-P AND 64-P LGT

BACKGROUND

Field

This disclosure is related to video compression technologies and inter-prediction and intra-prediction in advanced video codec. In particular, the disclosure is related to next-generation video coding technologies including video coding/decoding technologies beyond High Efficiency Video Coding (HEVC), such as Versatile Video Coding (VVC), AOMedia Video 1 (AV1) and its successors. More specifically, an aspect of the disclosure is directed to a method, an apparatus and computer-readable medium that perform complexity reduction for 32-point and 64-point line graph transforms (LGTs).

Description of Related Art

Video coding and decoding using inter-picture or intra-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 hertz (Hz). Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video may require more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A person of ordinary skill generally understands video compression/decompression technology. In general, to compress video or image data, a series of functional steps are performed to result in a compressed video or image file. Although an image, such as a 360° image (e.g., captured by a 360° camera) may be suitable for compression, for ease of reading, compression of a video file will be explained. To generate a compressed video file, under conventional standards (e.g., H.264, H.265) an uncompressed video sample stream that is received from a video source may be partitioned or parsed, which results in a block of samples of two or more reference pictures.

Bi-Prediction can relate to techniques where a prediction unit (PU), such as a predicted block of samples, can be predicted from two motion compensated blocks of samples of two or more reference pictures. Bi-prediction was first introduced into video coding standards in MPEG-1, and has also been included in other video coding technologies and standards such as MPEG-2 Part 2 (or H.262), H.264 and H.265 as well.

When decompressing a compressed video file, during the reconstruction of a sample of a bi-predicted PU, motion compensated and interpolated input samples from each reference block can be multiplied by a weighting factor that can be different for each reference block, and such weighted sample values of the two reference blocks can be added to generate the sample under reconstruction. Such sample can be processed further by mechanisms such as loop filtering.

In MPEG-1 and MPEG-2, the weighting factors can be determined based on the relative temporal distance between the picture to which the PU under reconstruction belongs to, and the two reference pictures. This is possible because, in MPEG-1 and MPEG-2, one of the two reference I or P pictures was in the "past", and the other in the "future" (in terms of presentation order) of the B-picture under reconstruction, and because in MPEG-1 and MPEG-2, there was a well-defined timing relationship established for any picture under reconstruction in relation to its reference pictures.

Starting with H.264, the reference picture selection concepts for bi-predicted pictures were relaxed such that the reference pictures only needed to be earlier in decoding order, but not in presentation order. Further, the notion of time was also relaxed in that neither H.264 nor H.265 requires a constrained/fixed picture interval in the time domain. Therefore, a decoder cannot calculate weighting factors any more based on the timing information available in the bitstream. Instead, H.264 and H.265 include a "default" of 0.5 as the weighting factor for the reference samples of a bi-predicted picture. This default can be overwritten by syntax available in the slice header known as pred_weight_table( ). The default of 0.5 or the information in the pred_weight_table may apply to all bi-predicted PUs in a given slice.

AOMedia Video 1 (AV1) was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

AOMedia Video 2 (AV2) is currently under development and the proposed 8-bit/10-bit transform cores are designed for it.

Listing of Related Art

Non-Patent Literature 1: H. E. Egilmez, E. Pavez, A. Ortega, "Graph learning from data under Laplacian and structural constraints", IEEE Journal of Selected Topics in Signal Processing., vol. 11, no. 6, Sep. 2017.

Non-Patent Literature 2: H. E. Egilmez, Y. H. Chao, A. Ortega, B. Lee, and S. Yea, "GBST: Separable transforms based on line graphs for predictive video coding," 2016 IEEE International Conference on Image Processing (ICIP), September 2016, pp. 2375-2379.

Non-Patent Literature 3: H. E. Egilmez, Y. H. Chao, and A. Ortega, "Graph-based transforms for video coding," CoRR, vol. abs/arXiv:1909.00952, 2019.

Non-Patent Literature 4: M. Zhou, Y. Hu, "CE6-related: A study of primary transforms," Joint Video Experts Team (WET) of ITU-T SG 16 WP 3 and ISO/IEC JTC 1/SC 29/WG 11, WET-M0046, 13th Meeting: Marrakesh, Mass., 9-18 Jan. 2019.

Problem(s) to be Solved

The disclosure is related to a set of advanced video coding technologies designed for efficient compression of video data. The proposed technology involves a) methods to reduce computational complexity of, for example, at least one of a 32-point and a 64-point Line Graph transforms (LGT).

SUMMARY

According to an aspect of the disclosure, a method of decoding a bitstream composed of video/image data may be performed by at least one processor, and may comprise: receiving the bitstream composed of the compressed video/image data. A bitstream may refer to an encoded video or image received by the decoder. The method may further comprise: generating one or more dequantized blocks by a process including but not limited to parsing the bitstream, decoding the entropy coded bitstream and dequantizing each block.

The method may further comprise: determining whether at least one of a height or a width of a dequantized block is greater than or equal to a pre-defined threshold.

The method may further comprise: based on determining that based on determining that the at least one of the height or the width of the dequantized block is greater than or equal to the pre-defined threshold: performing transform coding of a reduced-complexity dequantized block using a line graph transform (LGT) core to perform direct matrix multiplications for each of the horizontal and vertical dimensions of the reduced-complexity dequantized block.

The method may further comprise: based on determining that the at least one of the height or the width of the dequantized block is not greater than or equal to the pre-defined threshold: performing transform coding of the original block using a line graph transform (LGT) core to perform direct matrix multiplications for each of the horizontal and vertical dimensions of the original block.

The predefined threshold may have a value corresponding to one of: 32 or 64. The predefined threshold may have a value corresponding to one of: 32, 64, 128, or 256.

The generating of the reduced-complexity block may include zeroing-out all coefficients except coefficients in an m×n subblock of the dequantized block, and the performing of the transform coding of the reduced-complexity dequan-tized block may include processing the m×n subblock of the dequantized block instead of processing the entire dequantized block.

The m×n subblock may include a part of the dequantized block that has a frequency that is lower than a frequency of another part of the original block corresponding to the dequantized block.

The m×n subblock may have a smaller size than a remaining part of the dequantized block, which is an M×N block, wherein m≤M and n≤N.

The performing of the transform coding of the reduced-complexity dequantized block using the LGT core may include applying an N-point LGT core to an M×N dequantized block where zero-out has been performed to all coefficients of the M×N dequantized block except those in an m×n subblock of the M×N dequantized block, wherein m≤M and n≤N.

The method of decoding may further comprise: switching an order of performing horizontal and vertical transforms when zero-out is enabled on the LGT core, depending on a ratio of dequantized block width to height (M/N).

The switching the order of the performing the horizontal and vertical transforms may include, for an M×N block with zero-out enabled for all coefficients except in an m×n subblock, if M is greater than N, performing M-point horizontal transform first, and then performing a N-point vertical transform second, and if N is greater than M, performing N-point vertical transform first, and then performing a M-point horizontal transform second, wherein m≤M and n≤N.

The performing of the transform coding of the reduced-complexity dequantized block using the LGT core may include: when a secondary transform is enabled for an M×N dequantized block with zero-out also enabled and an input to the secondary transform is first K coefficients along a scanning order, all coefficients outside of the m×n subblock, are zeroed-out.

The method of decoding may further comprise storing, in a memory, in advance, a pre-defined table that associates dequantized blocks of different block width and block height sizes (M×N) with subblocks of different subblock width and subblock height sizes (m×n), where all coefficients outside of the m×n region are zeroed-out.

According to an aspect, at least one of a block height or width of the dequantized block may be greater than or equal to 32, and a block height and a width of the reduced-complexity dequantized block may be 16×16.

According to an aspect, at least one of a block height or width of the dequantized block is greater than or equal to 64, and a block height and a width of the reduced-complexity dequantized block is 16×16.

According to an aspect, a non-transitory computer-readable storage medium may be provided that stores instructions that, when executed, cause a system or device comprising one or more processors to perform one or more of the methods described in the specification.

According to an aspect, an apparatus may comprise: at least one memory configured to store computer program code; and at least one processor configured to access the at least one memory and operate according to the computer program code, the computer program code comprising: receiving code configured to cause the at least one processor to receive a bitstream composed of compressed video/image data; generating code configured to cause the at least one processor to generate dequantized blocks by a process including but not limited to parsing the bitstream, decoding the entropy coded bitstream and dequantizing each block;

determining code configured to cause the at least one processor to determine whether at least one of a height or a width of the dequantized block is greater than or equal to a pre-defined threshold; and reduced-complexity code configured to cause the at least one processor to: based on determining that the at least one of the height or the width of the dequantized block is greater than or equal to the pre-defined threshold: perform transform coding of a reduced-complexity dequantized block using a line graph transform (LGT) core to perform direct matrix multiplications for each of the horizontal and vertical dimensions of the reduced-complexity block.

According to an aspect, the at least one memory may store, in advance, a pre-defined table that associates dequantized blocks of different block width and block height (M×N) sizes with subblocks of different width and subblock height (m×n) sizes, and the reducing the number of non-zero coefficients in the dequantized block includes all coefficients outside of the m×n region being zeroed-out.

The apparatus may further comprise a display, wherein the computer program code may further comprise: display code configured to cause the at least one processor to: generate a displayable image based at least in part on the transformed reduced-complexity dequantized block; and perform control so that the displayable image is displayed by the display.

According to an aspect of the disclosure, a method of coding image data performed by at least one processor, may comprise: receiving information regarding a data block of an image; determining whether at least one of a height or a width of a residual coding block corresponding to the data block of the image is greater than or equal to a pre-defined threshold; and based on determining that the at least one of the height or the width of the residual coding block is greater than or equal to the pre-defined threshold: identifying or generating a reduced-complexity residual coding block by reducing the number of non-zero coefficients in the residual coding block; and performing transform coding of the reduced-complexity residual coding block using a line graph transform (LGT) core to perform direct matrix multiplications for each of the horizontal and vertical dimensions of the reduced-complexity coding block.

The predefined threshold may have a value corresponding to one of: 32 or 64.

The predefined threshold may have a value corresponding to one of: 32, 64, 128, or 256.

The generating of the reduced-complexity residual coding block may include zeroing-out all coefficients except coefficients in an m×n subblock of the residual coding block, and the performing of the transform coding of the reduced-complexity residual coding block includes processing the m×n subblock of the residual coding block instead of processing the entire residual coding block.

The m×n subblock may include a part of the residual coding block that has a frequency that is lower than a frequency of another part of the coding block corresponding to the residual data block. For example, an upper portion may include a low-frequency part, which includes most of the important (e.g., human observable) data, and the high-frequency part may not be as important.

The m×n subblock may have a smaller size than a remaining part of the residual coding block, which is an M×N coding block, wherein m≤M and n≤N.

The performing of the transform coding of the reduced-complexity residual coding block using the LGT core may include applying an N-point LGT core to an M×N residual coding block where zero-out has been performed to all coefficients of the M×N residual coding block except those in an m×n subblock of the M×N residual coding block, wherein m≤M and n≤N.

The method may further comprise: switching an order of performing horizontal and vertical transforms when zero-out is enabled on the LGT core, depending on a ratio of coding block width to height (M/N).

The switching the order of the performing the horizontal and vertical transforms may include, for an M×N coding block with zero-out enabled for all coefficients except in an m×n subblock, if M is greater than N, performing M-point horizontal transform first, and then performing a N-point vertical transform second, and if N is greater than M, performing N-point vertical transform first, and then performing a M-point horizontal transform second, wherein m≤M and n≤N.

The performing of the transform coding of the reduced-complexity residual coding block using the LGT core may include: when a secondary transform is enabled for an M×N residual coding block with zero-out also enabled and an input to the secondary transform is first K coefficients along a scanning order, all coefficients outside of the m×n subblock, are zeroed-out.

The method may further include: storing, in a memory, in advance, a pre-defined table that associates residual coding blocks of different block width and block height sizes (M×N) with subblocks of different subblock width and subblock height sizes (m×n), where all coefficients outside of the m×n region are zeroed-out.

According to an embodiment, at least one of a block height or width of the residual coding block may be greater than or equal to 32, and a block height and a width of the reduced complexity residual data block may be 16×16.

According to an embodiment, at least one of a block height or width of the residual coding block may be greater than or equal to 64, and a block height and a width of the reduced complexity residual data block may be 16×16.

According to an aspect of the disclosure, a non-transitory computer-readable storage medium may store instructions that, when executed, cause a system or device comprising one or more processors to: receive information regarding a data block of an image; determine whether at least one of a height or a width of a residual coding block corresponding to the data block of the image is greater than or equal to a pre-defined threshold; and based on determining that the at least one of the height or the width of the residual coding block is greater than or equal to the pre-defined threshold: identify or generate a reduced-complexity residual coding block by reducing the number of non-zero coefficients in the residual coding block; and perform transform coding of the reduced-complexity residual coding block using a line graph transform (LGT) core to perform direct matrix multiplications for each of the horizontal and vertical dimensions of the reduced-complexity coding block.

According to an aspect of the disclosure, an apparatus may comprise: at least one memory configured to store computer program code; and at least one processor configured to access the at least one memory and operate according to the computer program code, the computer program code comprising: receiving code configured to cause the at least one processor to receive information regarding a data block of an image; determining code configured to cause the at least one processor to determine whether at least one of a height or a width of a residual coding block corresponding to the data block of the image is greater than or equal to a pre-defined threshold; reduced-complexity code configured to cause the at least one processor to: based on determining that the at least one of the height or the width of the residual coding block is greater than or equal to the pre-defined threshold: identify or generate a reduced-complexity residual coding block by reducing the number of non-zero coefficients in the residual coding block; and transform coding code configured to cause the at least one processor to perform transform coding of the reduced-complexity residual coding block using a line graph transform (LGT) core to perform direct matrix multiplications for each of the horizontal and vertical dimensions of the reduced-complexity coding block.

The memory may further store in advance, a pre-defined table that associates residual coding blocks of different block width and block height (M×N) sizes with subblocks of different width and subblock height (m×n) sizes.

The reducing the number of non-zero coefficients in the residual coding block may include all coefficients outside of the m×n region being zeroed-out.

The apparatus may further comprise a display (e.g., a display screen or a separate display device, such as, a smartphone or projector).

The computer program code may further comprise: display code configured to cause the at least one processor to: generate a displayable image based at least in part on the transformed reduced-complexity residual coding block; and perform control so that the displayable image is displayed by the display.

According to an aspect of the disclosure, a decoding method may comprise: decoding a reduced-complexity residual coding block, wherein the reduced complexity residual coding block uses an inverse transform to generate an original residual coding block, wherein the original residual coding block corresponds to a data block of an image, and the reduced-complexity residual coding block is generated by reducing the number of non-zero coefficients in the original residual coding block.

The decoding method may include wherein the reduced-complexity residual coding block is a transformed coding block in which transform coding has been performed thereon, the transform coding including using a line graph transform (LGT) core to perform direct matrix multiplications for each of the horizontal and vertical dimensions of a first reduced-complexity coding block, where the transformed coding block is a second reduced-complexity coding block.

The decoding method may include generating a displayable image based at least in part on the decoded reduced-complexity residual coding block; and performing control so that the displayable image is displayed by a display.

BRIEF DESCRIPTION OF THE DRAWINGS

Further features, the nature, and various advantages of the disclosed subject matter will be more apparent from the following detailed description and the accompanying drawings in which.

Table 2 (FIG. 5B) shows AV1 hybrid transform kernels and their availability based on prediction modes and block sizes.

Figures 5C, 5D:
FIG. 5A shows a Table 1 showing AV1 primary transform basis functions (DCT-2, DST-4 and DST-7 for N-point input), according to an embodiment.

FIG. 5C shows a Generic LGT characterized by self-loop weights and edge weights, according to an example embodiment.

FIG. 5D shows a matrix Lc, according to an example embodiment.

FIG. 5E shows a the 4×4 input block X, according to an example embodiment.

Figure 6A:
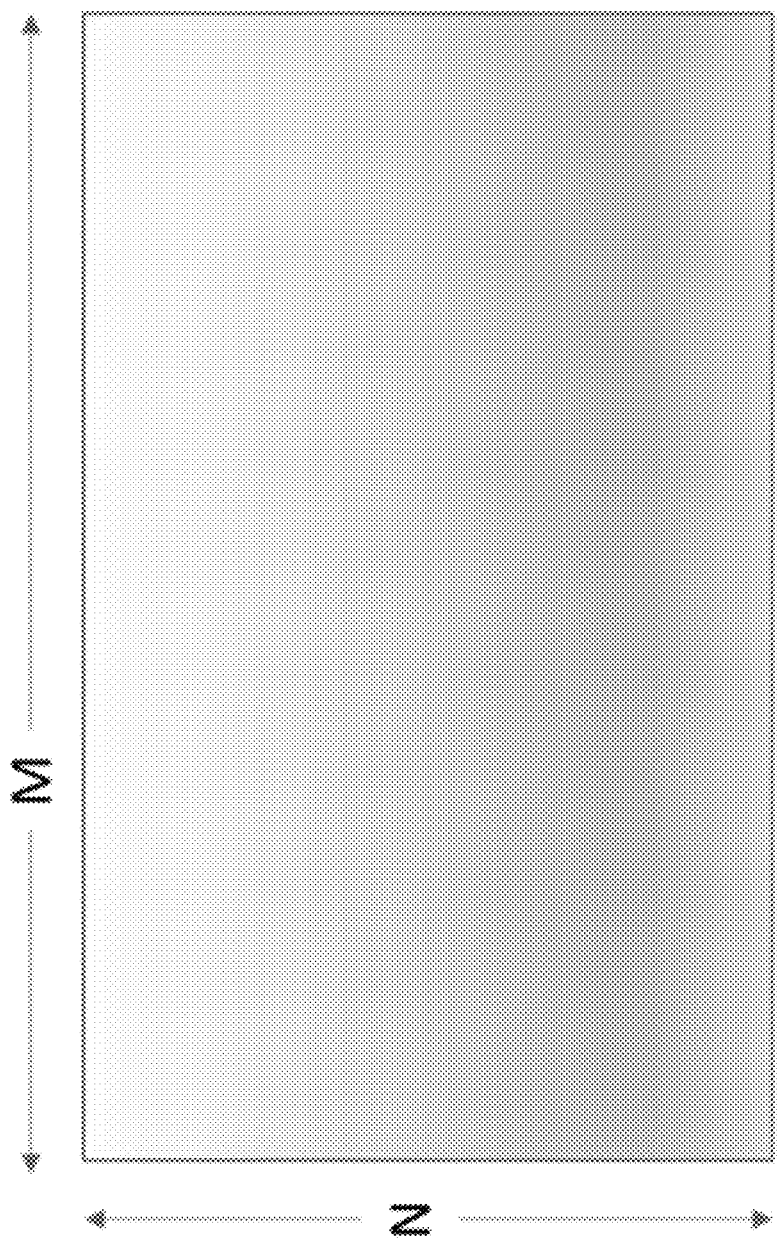

FIGS. 6A and 6B shows multiplications per coefficient required for transform coding a block of size M×N, according to an embodiment.

Figure 7:
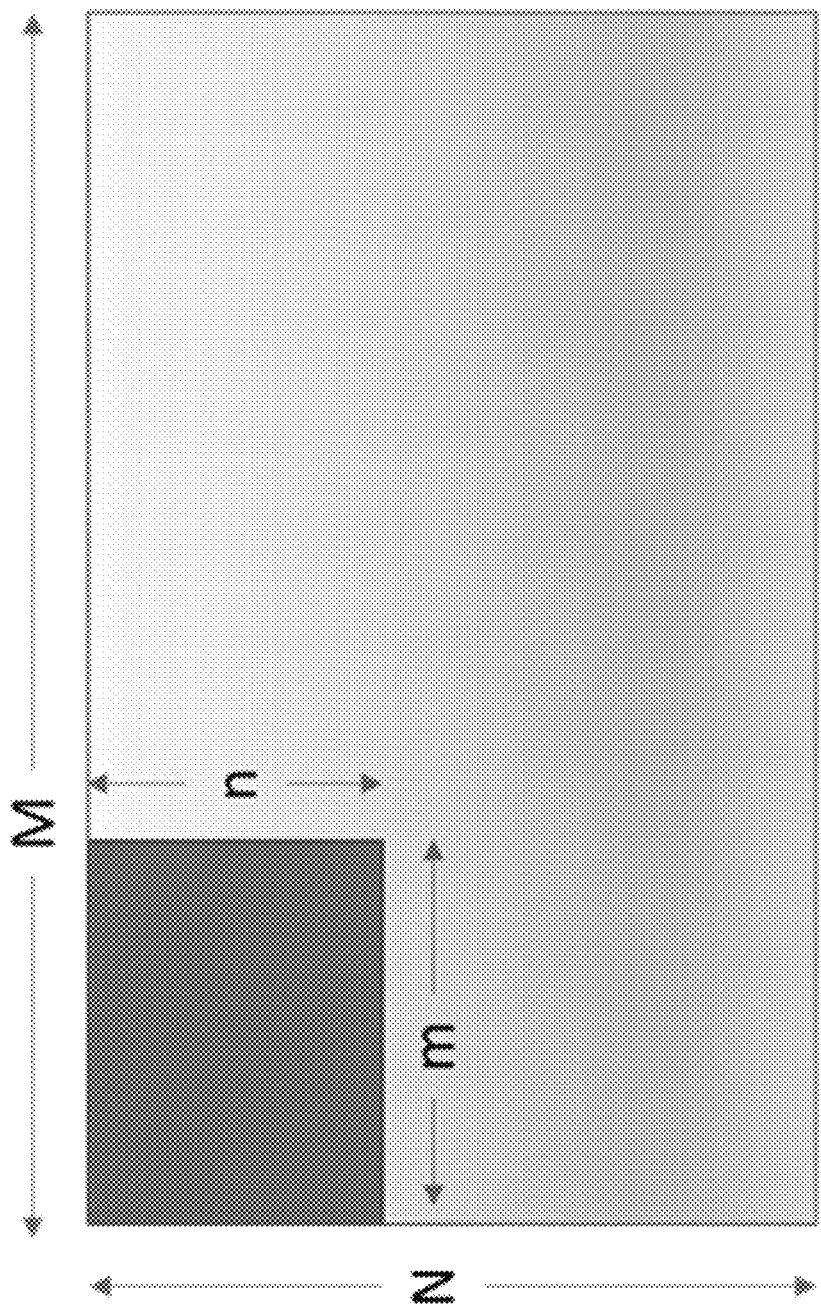

FIG. 7 shows an m×n subblock of M×N coding block, according to an embodiment.

FIG. 8 shows Table 4, which is a pre-defined table that associates coding blocks of size M×N with subblocks of size m×n, where all coefficients outside the m×n region is zeroed-out, according to an embodiment.

Figure 9A:
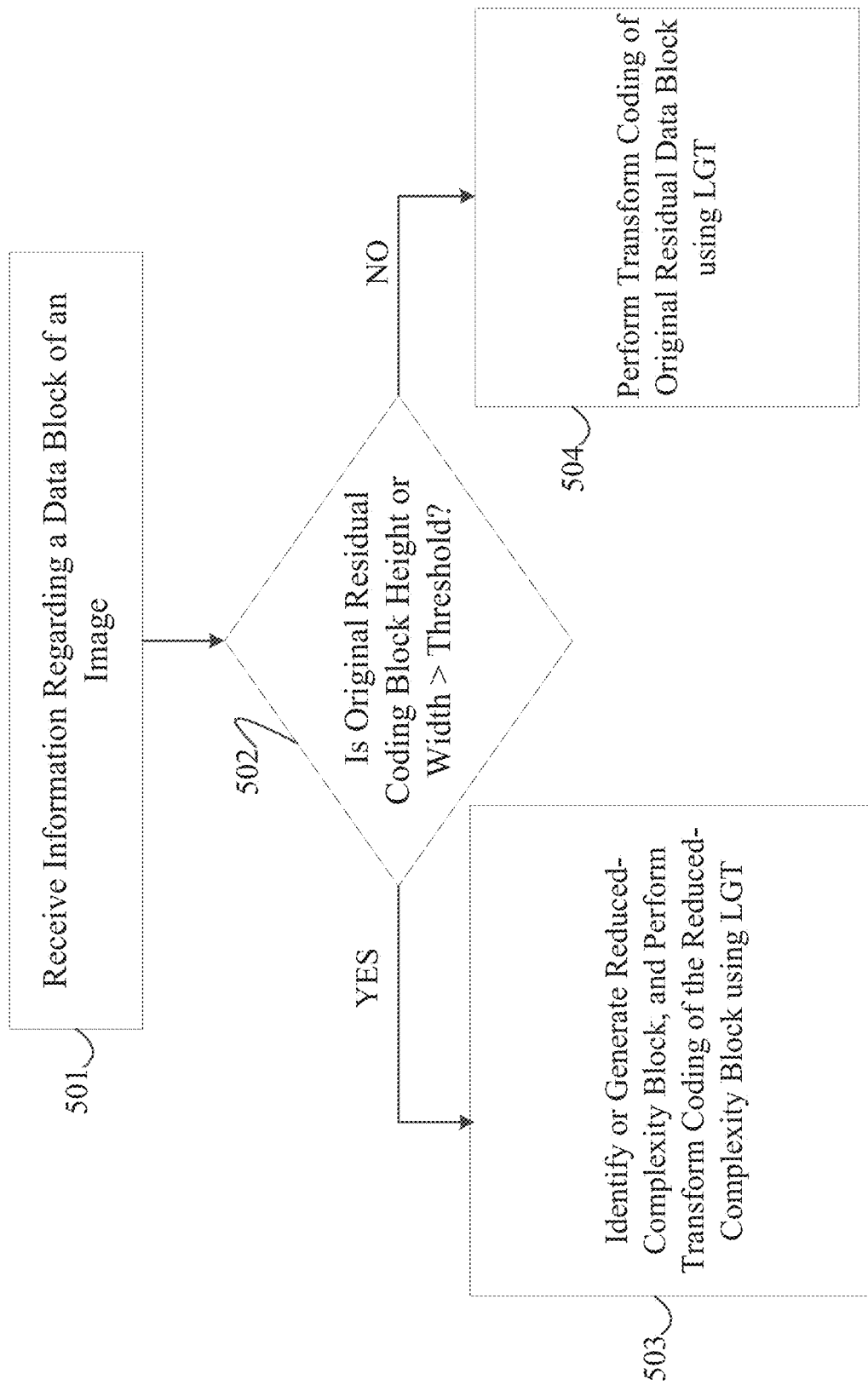

FIG. 9A is a schematic illustration of an exemplary method in accordance with an embodiment.

Figure 9B:
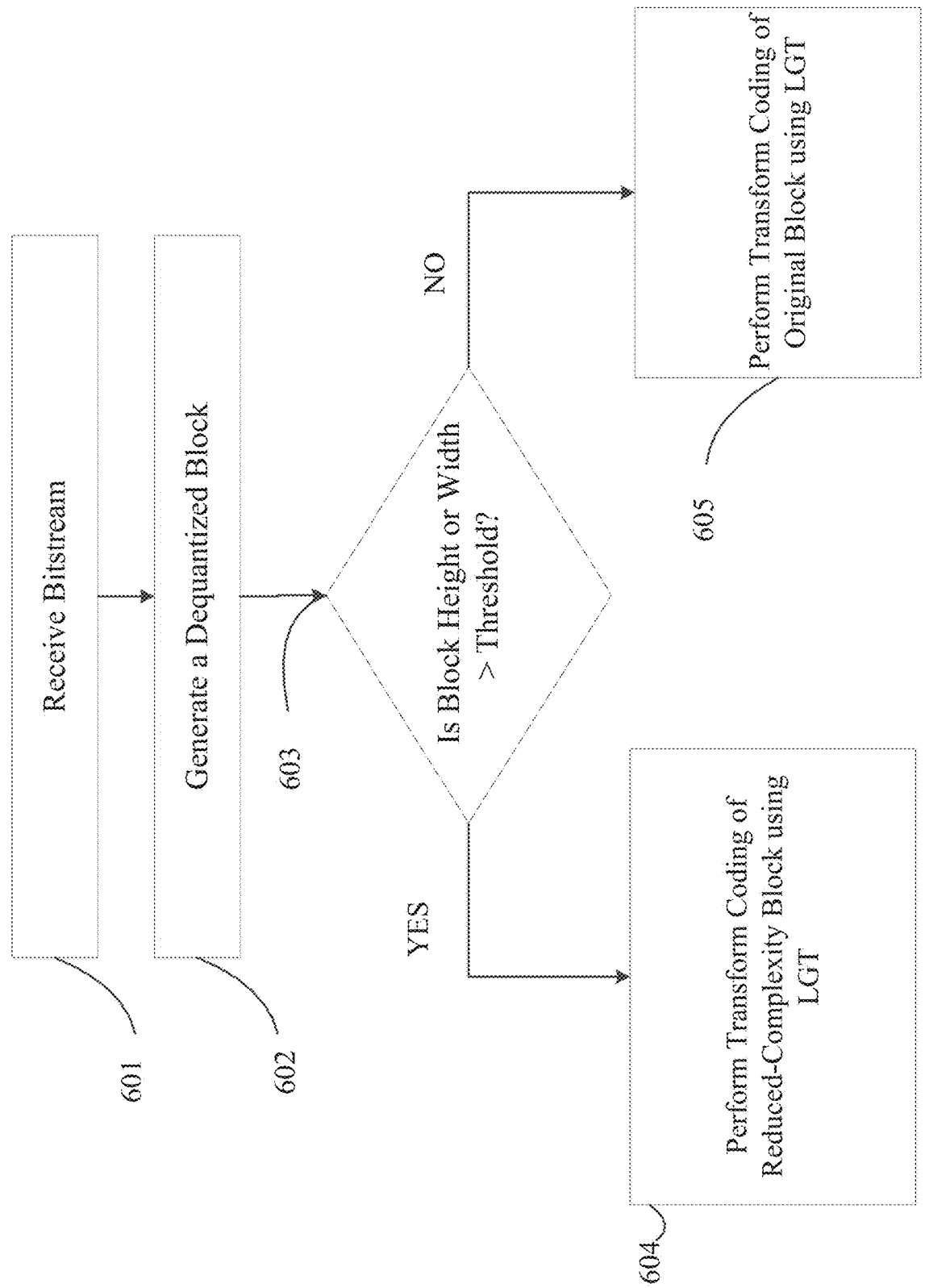

FIG. 9B is a schematic illustration of an exemplary method in accordance with an embodiment.

FIG. 10 is a schematic illustration of a computer system in accordance with an embodiment.

DETAILED DESCRIPTION

Figure 1:
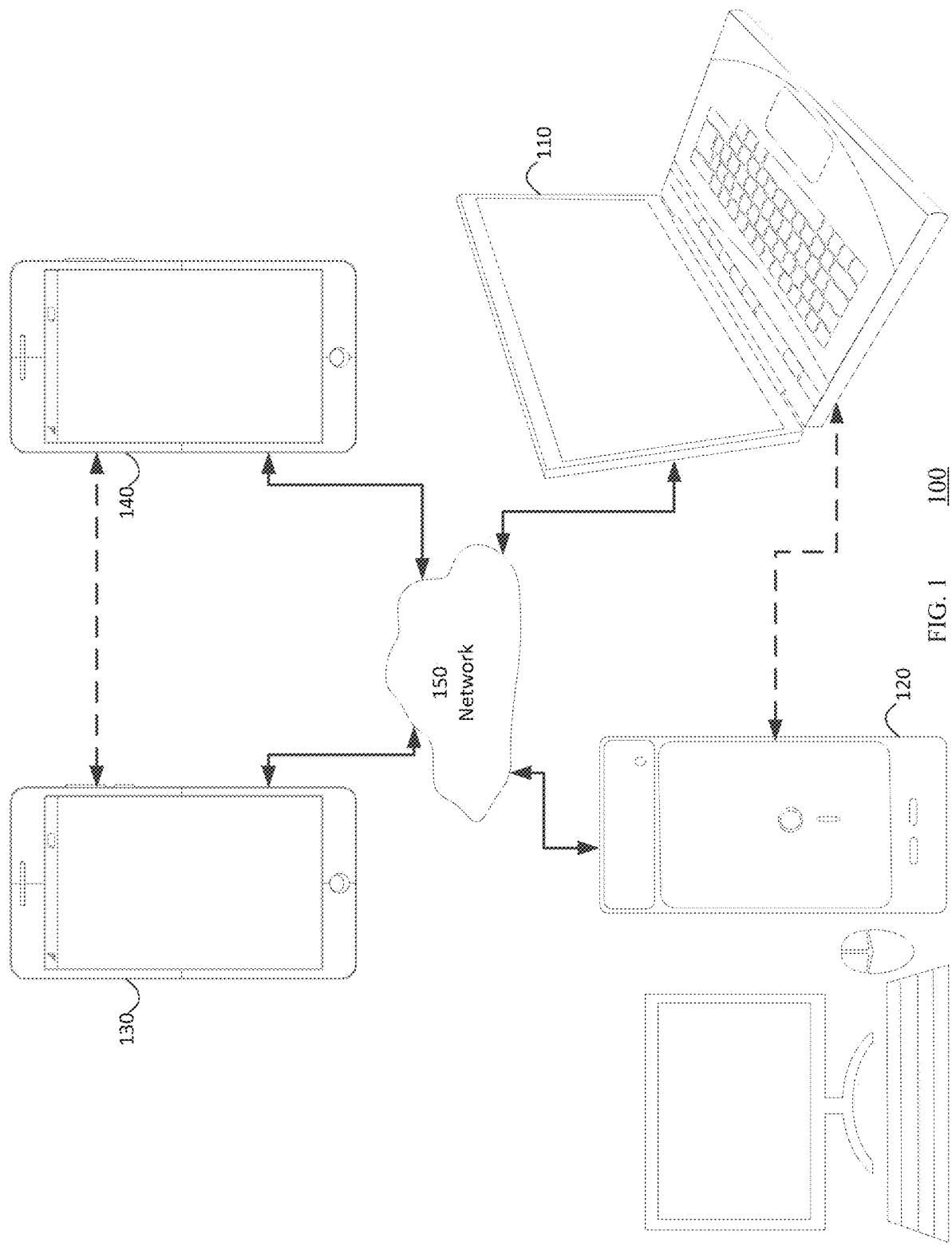
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as a laptop 110, a server 120, and smartphones 130 and 140, but the principles of the present disclosure are not so limited. Embodiments of the present disclosure find application with other equipment including but not limited to laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
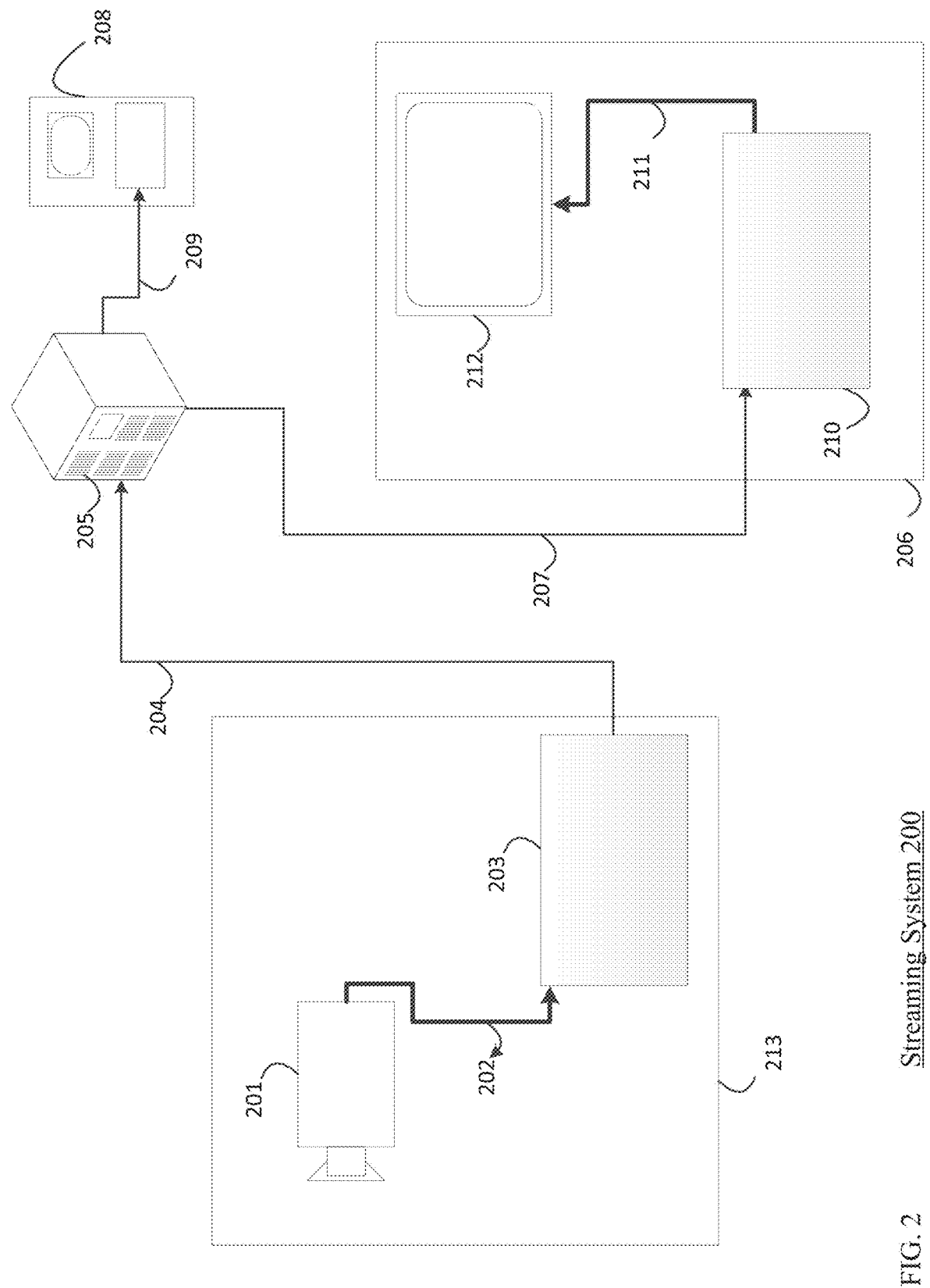
FIG. 2 is a schematic illustration of a simplified block diagram of a streaming system in accordance with an embodiment.

FIG. 2 illustrates, as an example for an application for the disclosed subject matter, the placement of a decoder 210 in a streaming environment/streaming system 200. Decoder 210 is further discussed with reference to FIG. 3 and the decoder 433 in FIG. 4. The decoder 210 may correspond to decoder 210 in FIG. 3 or the decoder 433 in FIG. 4.

The disclosed subject matter can be equally applicable to other video enabled applications, including, for example, video conferencing, digital TV, storing of compressed video on digital media including CD, DVD, memory stick and the like, and so on.

As shown in FIG. 2, a streaming system (200) may include a capture subsystem (213), which can include a video source (201), for example a digital camera, which may create an uncompressed video sample stream (202). That sample stream (202), depicted as a bold line to emphasize a high data volume when compared to encoded video bit streams, can be processed by a source encoder (203) coupled to the camera (201). The source encoder (203) can include hardware (e.g., a processor or circuit and memory), software, or a combination thereof to enable or implement aspects of the disclosed subject matter as described in more detail below. The encoded video bit stream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which may decode the incoming copy of the encoded video bitstream (207) and may create an outgoing video sample stream (211) that can be rendered on a display (212) or other rendering device.

Figure 3:
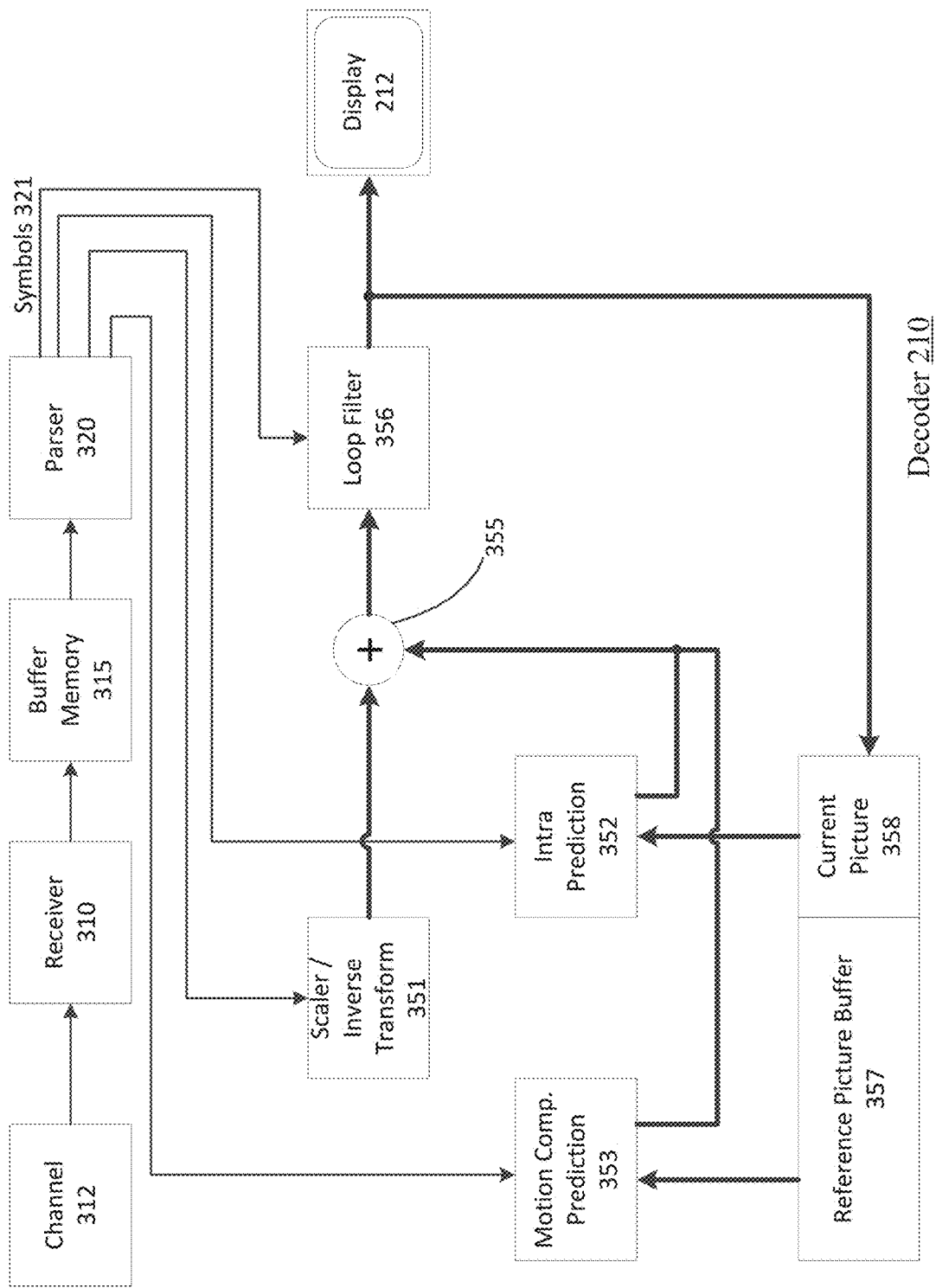
FIG. 3 is a schematic illustration of a simplified block diagram of a decoder in accordance with an embodiment.

FIG. 3 illustrates a functional block diagram of a decoder (210) (e.g., a video decoder) according to an embodiment of the present disclosure. As shown in FIG. 3, a receiver (310) may receive one or more codec video sequences to be decoded by the decoder (210). In the same or another embodiment, one coded video sequence may be received at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between a receiver (310) and an entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, which can be comparatively large and can advantageously be of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as shown in FIGS. 2 and 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser 320 may also extract from the coded video sequence information such as transform coefficients, quantizer parameter values, motion vectors, and so forth.

The parser (320) may perform entropy decoding/parsing operation on the video sequence received from the buffer (315), so as to create symbols (321). Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit may be the scaler/inverse transform unit (351). The scaler/inverse transform unit (351) may receive a quantized transform coefficient as well as control information, including which transform to use, a block size, a quantization factor, quantization scaling matrices, etc. as symbol(s) (321) from the parser (320). It can output blocks comprising sample values that can be input into an aggregator (355).

In some cases, the output samples of the scaler/inverse transform (351) can pertain to an intra-coded block, which is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter-coded block, and a potentially motion compensated block. In such a case, a Motion Compensation Prediction unit (353) can access reference a picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), and/or maximum reference picture size. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
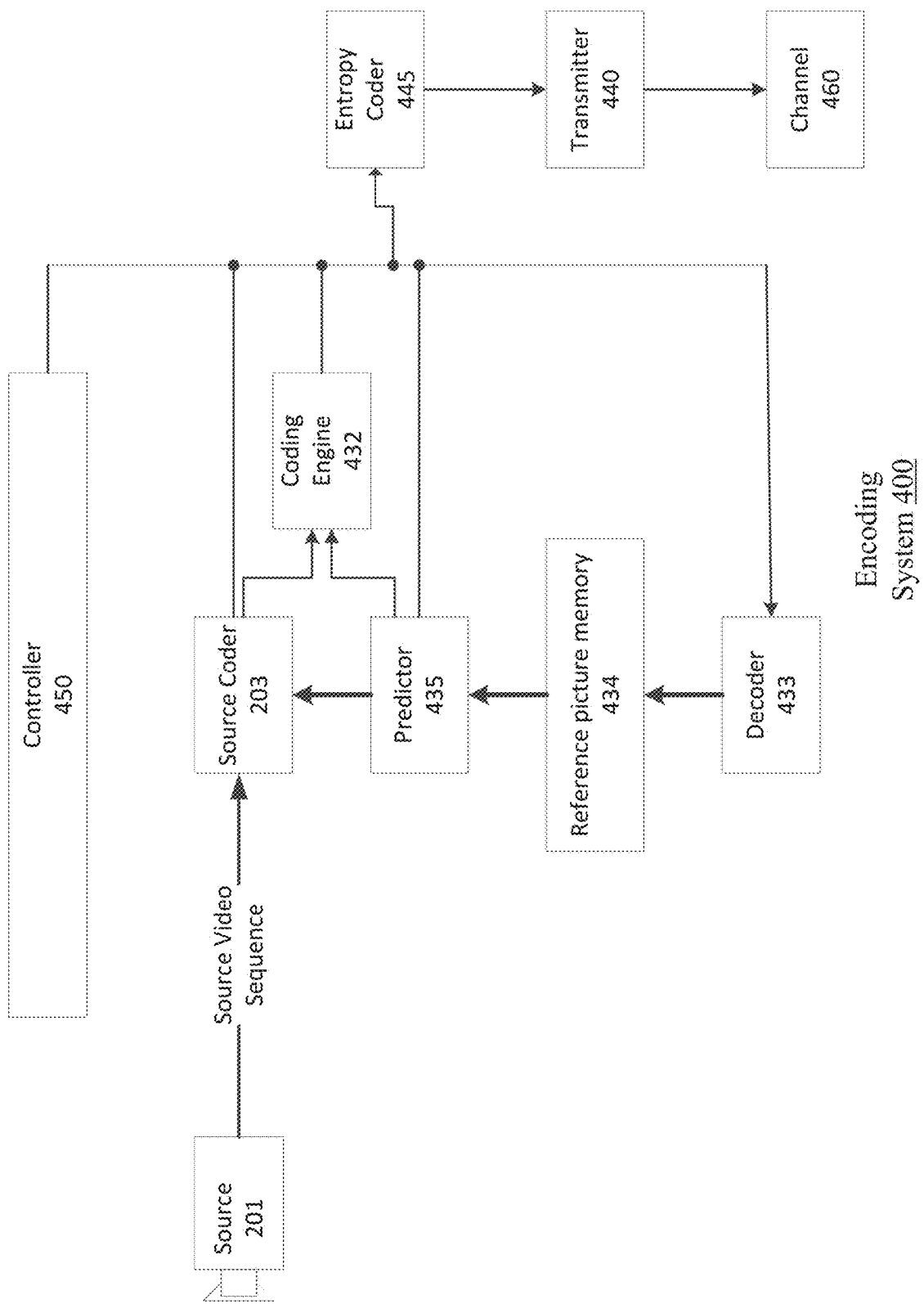
FIG. 4 is a schematic illustration of a simplified block diagram of an encoding system including an encoder and a local decoder in accordance with an embodiment.

FIG. 4 may be a functional block diagram of an encoding system (400) including a source coder (203), which may be a video encoder (203) according to an embodiment of the present disclosure.

The encoder (203) may receive video samples from a video source (201) (that is not a part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device, which may include a memory and processor, that stores previously prepared video. In a videoconferencing system, the video source (201) may include a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence in real time or under any other time constraints as required by the application. Enforcing appropriate coding speed is one function of controller (450). The controller 450 may control other functional units as described below and is functionally coupled to these units. The coupling is not depicted for clarity. Parameters set by the controller 450 can include rate control related parameters (e.g., picture skip, quantizer, lambda value of rate-distortion optimization techniques), a picture size, a group of pictures (GOP) layout, a maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of a source encoder (430) ("source coder" or "source encoder" henceforth), which is responsible for creating symbols based on an input picture to be coded, and a reference picture(s), and a local decoder (433) embedded in the encoder (203) that reconstructs the symbols to create the sample data a remote decoder 210 also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of a decoder location (local or remote), the reference picture buffer content is also bit exact between local encoder and remote encoder. In other words, the prediction part of an encoder "sees," as reference picture samples, exactly the same sample values as a decoder would "see" when using prediction during decoding. This fundamental principle of reference picture synchronicity (and resulting drift, if synchronicity cannot be maintained, for example, because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210) (including channel (312), receiver (310), buffer (315), and parser (320)) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies are the inverse of the described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the source encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450), which may include a processor, may manage coding operations of the source coder (203), including, for example, setting of parameters and subgroup parameters used for encoding the video data.

Output of all aforementioned functional units may be subjected to entropy coding in the entropy coder (445). The entropy coder may translate the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the source coder (203) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types from among, for example, an Intra Picture (I picture), a Predictive picture (P picture) and a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The source coder (203) may perform coding operations according to a predetermined video coding technology or standard, such as ITU-T Rec. H.265, or VVC. In its operation, the source coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, the coding of the coded video sequence can be in accordance with a video coding technology or standard, and can follow principles well known to a person skilled in the art, including variable length coding, Huffman coding, arithmetic coding with or without context sensitivity, and so forth. In some streaming systems, the video bitstreams (204, 207, 209) can be encoded according to certain video coding/compression standards. An example of those standards include ITU-T HEVC Recommendation of H.265.

AV1 Primary Transforms

In order to support the extended coding block partitions in AOMedia Video 1 (AV1), multiple transform sizes (ranging from 4-point to 64-point for each dimension) and transform shapes (square; rectangular with width/height ratio's 2:1/1: 2, and 4:1/1:4) are introduced in AV1.

Transform Kernels

The two-dimensional (2D) transform process may involve the use of hybrid transform kernels (e.g., composed of different one-dimensional (1D) transforms for each dimension of the coded residual block). According to an embodiment, sizes of the primary 1D transforms may be: a) 4-point, 8-point, 16-point, 32-point, or 64-point DCT-2; b) 4-point, 8-point, or 16-point asymmetric DST's (DST-4, DST-7) and their flipped versions; c) 4-point, 8-point, 16-point, or 32-point identity transforms. The basis functions for the DCT-2 and asymmetric DST's used in AV1 are listed in Table 1, which is shown in FIG. 5A.

Table 1 in FIG. 5A shows AV1 primary transform basis functions (DCT-2, DST-4 and DST-7 for N-point input).

TABLE 1

| Transform Type | Basis function $T_i(j)$, i, j = 0, 1, . . . , N − 1 |
| --- | --- |
| DCT-2 | $T_i(j) = \omega_0 \cdot \sqrt{\frac{2}{N}} \cdot \cos\left(\frac{\pi \cdot i \cdot (2j+1)}{2N}\right)$ <br><br> where $\omega_0 = \begin{cases} \sqrt{\frac{2}{N}} & i = 0 \\ 1 & i \neq 0 \end{cases}$ |
| DST-4 | $T_i(j) = \sqrt{\frac{2}{N}} \cdot \sin\left(\frac{\pi \cdot (2i+1) \cdot (2j+1)}{4N}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

The availability of hybrid transform kernels may be based on the transform block size and prediction mode. This dependency is listed in Table 2, which is shown in FIG. 5B.

Table 2 (FIG. 5B) shows AV1 hybrid transform kernels and their availability based on prediction modes and block sizes. In Table 2, the symbols "→" and "↓" denote the horizontal and vertical dimensions, respectively, and the symbols "✓" and "x" denotes availability and unavailability, respectively, of a kernel for that block size & prediction mode.

High Frequency Zero Out

According to an embodiment, the computational cost of large size transforms (e.g., 32 or 64 point or greater) may be further reduced by zeroing out all coefficients except: a) the top-left 32×32 low frequency coefficients of 64×64/64×32/ 32×64 DCT_DCT hybrid transforms, and/or b) the top-left 16×16 low frequency coefficients of 64×16/16×64 DCT_DCT hybrid transforms.

Walsh-Hadamard Transform

An invertible 4×4 Walsh-Hadamard transform may also be employed for lossless coding, according to an embodiment.

As an example, if there is an edge that is bright radiant in the video, slight changes in luminosity in a bright region won't even be noticed by a human because, for example, all white. Thus, those regions can be discarded using the method of an embodiment.

Primary Transforms for AV2

In the AV2 development process, line graph transforms (LGT) have been introduced with the view of replacing and extending (by introducing 32-point, 64-point) the 1D DST's described above.

Graphs are generic mathematical structures consisting of sets of vertices and edges, which may be used for modelling affinity relations between the objects of interest. See, e.g., Non-Patent Literature 1. In practice, weighted graphs (for which a set of weights are assigned to edges and potentially to vertices) may provide sparse representations for robust modeling of signals/data. LGTs can improve coding efficiency by providing a better adaptation for diverse block statistics. In Non-Patent Literatures 2 and 3, separable LGTs are designed and optimized by learning line graphs from data to model underlying row and column-wise statistics of blocks residual signals, where the associated generalized graph Laplacian (GGL) matrices are used to derive LGTs.

For example, FIG. 5C shows a Generic LGT characterized by self-loop weights vc1, vc2 and edge weights wc.

According to an embodiment, as shown in FIG. 5D, given a weighted graph G (W, V) the GGL matrix may be defined as:

$$L_c = D - W + V \tag{Eq. 1}$$

where W is the adjacency matrix consisting of non-negative edge weights $w_c$, D is the diagonal degree matrix, and V is the diagonal matrix denoting weighted self-loops $v_{c1}$, $v_{c2}$. As shown in FIG. 5D, the matrix $L_c$ can be represented as:

$$L_c = \begin{bmatrix} \omega_c + v_{c1} & -\omega_c & & & 0 \\ -\omega_c & 2\omega_c & -\omega_c & & \\ & \ddots & \ddots & \ddots & \\ & & -\omega_c & 2\omega_c & -\omega_c \\ 0 & & & -\omega_c & \omega_c + v_{c2} \end{bmatrix} \text{ for } \omega_c > 0. \tag{Eq. 2}$$

The LGTs can then be derived by the eigen-decomposition of the GGL $L_c$.

$$L_c = U\Phi U^T \tag{Eq. 3}$$

where columns of orthogonal matrix U are the basis vectors of the LGT, and Φ is the diagonal eigenvalue matrix.

In fact, DCTs and DSTs, including DCT-2, DCT-8 and DST-7, may be LGTs derived from certain forms of GGLs, such as:

DCT-2 is derived by setting $v_{c1} = 0$
DST-7 is derived by setting $v_{c1} = w_c$
DCT-8 is derived by setting $v_{c2} = w_c$
DST-4 is derived by setting $v_{c1} = 2w_c$
DCT-4 is derived by setting $v_{c2} = 2w_c$ In AV2, the LGTs may be implemented as matrix multiplications. The 4p LGT core may be derived by setting $v_{c1} = 2w_c$ in $L_c$, which means that it is a DST-4. The 8p LGT core may be derived by setting $v_{c1} = 1.5w_c$ in $L_c$, the 16p and 32p, and 64p LGT core may be derived by setting $v_{c1}=w_c$ in $L_c$, which means that it is a DST-7.

Secondary Transforms for AV2

In AV1, transform schemes are only separable, which is not very efficient for capturing directional texture patterns, such as, edges which are 45-degree direction. In the ongoing AV2 development process, a non-separable transform design is also proposed for improvement of coding efficiency, especially for directional image patterns. NSST (non-separable secondary transform), may be applied between forward primary transform and quantization (at encoder) and between de-quantization and inverse primary transform (at decoder side). A 4×4 non-separable transform or 8×8 non-separable transform may be applied according to block size. Application of NSST, is described as follows using input as an example. As shown in FIG. 5E, to apply 4×4 NSST, the 4×4 input block X may correspond to:

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 4)}$$

is first represented as a vector $\vec{X}$ $$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad \text{(Eq. 5)}$$

In the above vector representation, the input block X may be scanned horizontally. The input block X may be scanned in a zigzag, a vertical or a diagonal pattern. The non-separable transform may be calculated as $\vec{F}=T\cdot\vec{X}$, where $\vec{F}$ indicates the transform coefficient vector, and T is a 16×16 transform matrix. The 16×1 coefficient vector $\vec{F}$ may be subsequently re-organized as 4×4 block using the scanning order for that block (zigzag, horizontal, vertical or diagonal). The coefficients with smaller index may be placed with the smaller scanning index in the 4×4 coefficient block.

However, transform coding using LGT cores involve the use of direct matrix multiplications for each dimension (horizontal & vertical), which is a computationally intensive processes for large transform sizes, especially 32p (32-point) and 64p (64-point). For example, the number of multiplications per coefficient (a measure of computational complexity) required for transform coding a block of size M×N (See FIG. 6A) where M or N can be 16, 32 & 64 is listed in Table 3, which is shown in FIG. 6B. See also Non-Patent Literature 4.

FIG. 6A shows an M×N coding block, according to an embodiment.

As shown in FIG. 6B, Table 3 shows multiplications per coefficient required for transform coding a block of size M×N. See Non-Patent Literature 4.

TABLE 3

| M (block width) | N (block height) | Multiplications per coefficient |
|---|---|---|
| 16 | 16 | 32 |
| 16 | 32 | 48 |
| 32 | 16 | 48 |
| 32 | 32 | 64 |
| 16 | 64 | 80 |
| 64 | 16 | 80 |
| 32 | 64 | 96 |

TABLE 3-continued

| M (block width) | N (block height) | Multiplications per coefficient |
|---|---|---|
| 64 | 32 | 96 |
| 64 | 64 | 128 |

From Table 3, it is evident that the computational complexity of transform coding blocks with sizes larger than 32×32 is at least a factor of 2 more than the 16×16 blocks. Thus, constraints on the number of non-zero coefficients supported per block of size M×N can be devised to reduce computational complexity with minimal impact on coding efficiency.

According to an embodiment, a method may be used separately or combined in any order. For example, the method may include enabling zero-out for N-point LGT when N is greater than or equal to a pre-defined threshold K. The term "zero-out" used throughout the instant application generally refers to any techniques that allow for masking or excluding a particular region or subblock such that it is not included in the transformation.

For example, in an embodiment, K can take values 32, 64, 128, or 256.

According to an embodiment, if an N-point LGT is applied to an M×N block, zero-out may be performed to all coefficients except those in an m×n subblock of the block (as shown in FIG. 7).

FIG. 7 shows an m×n subblock of M×N coding block

For example, in an one embodiment, m=min (M, K); where 4≤K≤M and n=min (N, K); where 4≤K≤N For example, in an embodiment, m×n subblock is located at the low-frequency part (top-left) of the coefficient block.

For example, in another embodiment, the zero-out is specified by a pre-defined table, wherein the table associates a set of M×N block sizes to a set of m×n subblock sizes. All coefficients except those in the m×n will be zeroed out. In one example, Table 4 associates a set of M×N block sizes to an m×n size of 16×16.

Example values of M and N in 2.a and 2.b include any value of the set {2, 4, 8, 16, 32, 64, 128, 256}

Example values of m and n in 2.a and 2.b include any value of the set {2, 4, 8, 16, 32, 64, 128, 256} with the additional constraint that m≤M and n≤N.

FIG. 8 shows Table 4, which is a pre-defined table that associates coding blocks of size m×N with subblocks of size m×n, where all coefficients outside the m×n region is zeroed-out. Table 4 is only an example.

TABLE 4

| M (block width) | N (block height) | m (subblock width) | n (subblock height) |
|---|---|---|---|
| 16 | 32 | 16 | 16 |
| 32 | 16 | 16 | 16 |
| 32 | 32 | 16 | 16 |
| 16 | 64 | 16 | 16 |
| 64 | 16 | 16 | 16 |
| 32 | 64 | 16 | 16 |
| 64 | 32 | 16 | 16 |
| 64 | 64 | 16 | 16 |

FIG. 8 shows Table 4, which is a pre-defined table that associates coding blocks of size m×N with subblocks of size m×n, where all coefficients outside the m×n region is zeroed-out. Table 4 is only an example.

According to an embodiment, 8×32 or 4×32 could also be addressed in Table 4. According to an embodiment, a formula to derive m and n could be used, instead of a table.

For example, m=min(M, K), n=min (N, K), where K can be 16.

For another example (this one seems to be the AV1 zero-out applied on 64×N and N×64), m=n=min (min (M, N), 16))

According to an embodiment, the order of performing horizontal and vertical transforms may be switched when zero-out is enabled on LGT, depending on the ratio of coding block width to height (M/N).

In one example, for an M×N coding block with zero-out enabled for all coefficients except in the m×n subblock, if M is greater than N, it is proposed to do M-point horizontal transform first, then do a N-point vertical transform second.

In one example, for an M×N coding block with zero-out enabled for all coefficients except in the m×n subblock, if N is greater than M, it is proposed to do N-point vertical transform first, then do a M-point horizontal transform second.

Example values of M and N in 3.a and 3.b include any value of the set {2, 4, 8, 16, 32, 64, 128, 256}

Example values of m and n in 3.a and 3.b include any value of the set {2, 4, 8, 16, 32, 64, 128, 256} with the additional constraint that m≤M and n≤N.

According to an embodiment, when secondary transform is enabled for an M×N coding block with zero-out also enabled, then all coefficients which are not involved in the secondary transform process are zeroed-out.

In one example, if secondary transform is applied to the top-left 8×8 region of the M×N block, the coefficients outside the top-left 8×8 (or 4×4) are zeroed-out.

In one example, if secondary transform is applied to the top-left 4×4 region of the M×N block, the coefficients outside the top-left 4×4 are zeroed-out.

Example values of M and N in 4.a and 4.b include any value of the set {2, 4, 8, 16, 32, 64, 128, 256}

According to an embodiment, when secondary transform is enabled for an M×N coding block with zero-out also enabled and the input to secondary transform is the first K coefficients along the scanning order, then all coefficients outside the m×n subblock, are zeroed-out.

In one example, the m×n subblock include all the K coefficients scanned for secondary transform and the rest of the (m×n)−K coefficients that cover the m×n region.

Example values of M and N in 3.a and 3.b include any value of the set {2, 4, 8, 16, 32, 64, 128, 256}.

Example values of m and n in 3.a and 3.b include any value of the set {2, 4, 8, 16, 32, 64, 128, 256} with the additional constraint that m≤M and n≤N.

Referring to FIG. 9A, in a first, simple example, according to an aspect of the disclosure, a method may comprise: receiving information regarding a data block of an image (Operation 501).

The method may further comprise: determining whether at least one of a height or a width of a residual coding block corresponding to the data block of the image is greater than or equal to a pre-defined threshold (Operation 502).

The method may further comprise: based on determining that the at least one of the height or the width of the residual coding block is greater than or equal to the pre-defined threshold: identifying or generating a reduced-complexity residual coding block by reducing the number of non-zero coefficients in the residual coding block; and performing transform coding of the reduced-complexity residual coding block using a line graph transform (LGT) core to perform direct matrix multiplications for each of the horizontal and vertical dimensions of the reduced-complexity coding block (Operation 503).

The method may further comprise: based on determining that the at least one of the height or the width of the residual coding block is not greater than or equal to the pre-defined threshold, performing transform coding of the original residual data block using a line graph transform (LGT) core to perform direct matrix multiplications for each of the horizontal and vertical dimensions of the original residual coding block (Operation 504).

The predefined threshold may have a value corresponding to one of: 32 or 64.

The predefined threshold may have a value corresponding to one of: 32, 64, 128, or 256.

The generating of the reduced-complexity residual coding block may include zeroing-out all coefficients except coefficients in an m×n subblock of the residual coding block, and the performing of the transform coding of the reduced-complexity residual coding block includes processing the m×n subblock of the residual coding block instead of processing the entire residual coding block.

The m×n subblock may include a part of the residual coding block that has a frequency that is lower than a frequency of another part of the coding block corresponding to the residual data block. For example, an upper portion may include a low-frequency part, which includes most of the important (e.g., human observable) data, and the high-frequency part may not be as important.

The m×n subblock may have a smaller size than a remaining part of the residual coding block, which is an M×N coding block, wherein m≤M and n≤N.

The performing of the transform coding of the reduced-complexity residual coding block using the LGT core may include applying an N-point LGT core to an M×N residual coding block where zero-out has been performed to all coefficients of the M×N residual coding block except those in an m×n subblock of the M×N residual coding block, wherein m≤M and n≤N.

The method may further comprise: switching an order of performing horizontal and vertical transforms when zero-out is enabled on the LGT core, depending on a ratio of coding block width to height (M/N).

The switching the order of the performing the horizontal and vertical transforms may include, for an M×N coding block with zero-out enabled for all coefficients except in an m×n subblock, if M is greater than N, performing M-point horizontal transform first, and then performing a N-point vertical transform second, and if N is greater than M, performing N-point vertical transform first, and then performing a M-point horizontal transform second, wherein m≤M and n≤N.

The performing of the transform coding of the reduced-complexity residual coding block using the LGT core may include: when a secondary transform is enabled for an M×N residual coding block with zero-out also enabled and an input to the secondary transform is first K coefficients along a scanning order, all coefficients outside of the m×n subblock, are zeroed-out.

The method may further include: storing, in a memory, in advance, a pre-defined table that associates residual coding blocks of different block width and block height sizes (M×N) with subblocks of different subblock width and subblock height sizes (m×n), where all coefficients outside of the m×n region are zeroed-out.

According to an embodiment, at least one of a block height or width of the residual coding block may be greater than or equal to 32, and a block height and a width of the reduced complexity residual data block may be 16×16.

According to an embodiment, at least one of a block height or width of the residual coding block may be greater than or equal to 64, and a block height and a width of the reduced complexity residual data block may be 16×16.

According to an aspect of the disclosure, a non-transitory computer-readable storage medium may store instructions that, when executed, cause a system or device comprising one or more processors to: receive information regarding a data block of an image; determine whether at least one of a height or a width of a residual coding block corresponding to the data block of the image is greater than or equal to a pre-defined threshold; and based on determining that the at least one of the height or the width of the residual coding block is greater than or equal to the pre-defined threshold: identify or generate a reduced-complexity residual coding block by reducing the number of non-zero coefficients in the residual coding block; and perform transform coding of the reduced-complexity residual coding block using a line graph transform (LGT) core to perform direct matrix multiplications for each of the horizontal and vertical dimensions of the reduced-complexity coding block.

According to an aspect of the disclosure, an apparatus may comprise: at least one memory configured to store computer program code; and at least one processor configured to access the at least one memory and operate according to the computer program code, the computer program code comprising: receiving code configured to cause the at least one processor to receive information regarding a data block of an image; determining code configured to cause the at least one processor to determine whether at least one of a height or a width of a residual coding block corresponding to the data block of the image is greater than or equal to a pre-defined threshold; reduced-complexity code configured to cause the at least one processor to: based on determining that the at least one of the height or the width of the residual coding block is greater than or equal to the pre-defined threshold: identify or generate a reduced-complexity residual coding block by reducing the number of non-zero coefficients in the residual coding block; and transform coding code configured to cause the at least one processor to perform transform coding of the reduced-complexity residual coding block using a line graph transform (LGT) core to perform direct matrix multiplications for each of the horizontal and vertical dimensions of the reduced-complexity coding block.

The memory may further store in advance, a pre-defined table that associates residual coding blocks of different block width and block height (M×N) sizes with subblocks of different width and subblock height (m×n) sizes.

The reducing the number of non-zero coefficients in the residual coding block may include all coefficients outside of the m×n region being zeroed-out.

The apparatus may further comprise a display (e.g., a display screen or a separate display device, such as, a smartphone or projector).

The computer program code may further comprise: display code configured to cause the at least one processor to: generate a displayable image based at least in part on the transformed reduced-complexity residual coding block; and perform control so that the displayable image is displayed by the display.

Referring to FIG. 9B, in a first, simple example, according to an aspect of the disclosure, a method of decoding a bitstream composed of video/image data may be performed by at least one processor, and may comprise: receiving the bitstream composed of the compressed video/image data (Operation 601). A bitstream may refer to an encoded video or image received by the decoder.

The method may further comprise: generating one or more dequantized blocks by a process including but not limited to parsing the bitstream, decoding the entropy coded bitstream and dequantizing each block (Operation 602).

The method may further comprise: determining whether at least one of a height or a width of a dequantized block is greater than or equal to a pre-defined threshold (Operation 603).

The method may further comprise: based on determining that based on determining that the at least one of the height or the width of the dequantized block is greater than or equal to the pre-defined threshold: performing transform coding of a reduced-complexity dequantized block using a line graph transform (LGT) core to perform direct matrix multiplications for each of the horizontal and vertical dimensions of the reduced-complexity dequantized block (Operation 604).

The method may further comprise: based on determining that the at least one of the height or the width of the dequantized block is not greater than or equal to the pre-defined threshold: performing transform coding of the original block using a line graph transform (LGT) core to perform direct matrix multiplications for each of the horizontal and vertical dimensions of the original block (Operation 605).

According to an aspect of the disclosure, a decoding method may comprise: decoding a reduced-complexity residual coding block, wherein the reduced complexity residual coding block uses an inverse transform to generate an original residual coding block, wherein the original residual coding block corresponds to a data block of an image, and the reduced-complexity residual coding block is generated by reducing the number of non-zero coefficients in the original residual coding block.

The decoding method may include wherein the reduced-complexity residual coding block is a transformed coding block in which transform coding has been performed thereon, the transform coding including using a line graph transform (LGT) core to perform direct matrix multiplications for each of the horizontal and vertical dimensions of a first reduced-complexity coding block, where the transformed coding block is a second reduced-complexity coding block.

The decoding method may include generating a displayable image based at least in part on the decoded reduced-complexity residual coding block; and performing control so that the displayable image is displayed by a display.

The techniques for encoding/decoding can be implemented by one or more processors that may execute computer software having computer-readable instructions that may be physically stored in one or more computer-readable media (e.g., a hard disk drive). For example, FIG. 10 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" or "computer readable medium" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software.

In addition or as an alternative, the computer system 700 may provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

The invention claimed is:

1. A method of decoding a coded bitstream composed of compressed video/image data performed by at least one processor, the method comprising:
    receiving the coded bitstream composed of the compressed video/image data;
    generating a dequantized block by a process including entropy decoding the coded bitstream and dequantizing a block;
    determining whether at least one of a height or a width of the dequantized block is greater than or equal to a pre-defined threshold; and
    based on determining that the at least one of the height or the width of the dequantized block is greater than or equal to the pre-defined threshold: obtaining a reduced-complexity dequantized block based on the dequantized block and performing transform coding of the reduced-complexity dequantized block using a line graph transform (LGT) core to perform direct matrix multiplications for each of the horizontal and vertical dimensions of the reduced-complexity dequantized block,
    wherein the performing the transform coding includes determining an order of performing horizontal and vertical transforms to the reduced-complexity dequantized block when zero-out is enabled on LGT, depending on a ratio of width to height (M/N) of the dequantized block.

2. The method of claim 1, wherein the pre-defined threshold has a value corresponding to one of: 32 or 64.

3. The method of claim 1, wherein the pre-defined threshold has a value corresponding to one of: 32, 64, 128, or 256.

4. The method of claim 1, wherein the generating of the reduced-complexity dequantized block includes zeroing-out all coefficients except coefficients in an m×n subblock of the dequantized block, and the performing of the transform coding of the reduced-complexity dequantized block includes processing the m×n subblock of the dequantized block instead of processing the entire dequantized block.

5. The method of claim 4, wherein the m×n subblock includes a part of the dequantized block that has a frequency that is lower than a frequency of another part of the dequantized block.

6. The method of claim 4, wherein the m×n subblock has a smaller size than a remaining part of the dequantized block, wherein the dequantized block has dimensions M×N and m≤M and n≤N.

7. The method of claim 1, wherein the performing of the transform coding of the reduced-complexity dequantized block using the LGT core includes applying an N-point LGT core to the dequantized block, which has dimensions M×N, where zero-out has been performed to all coefficients of the M×N dequantized block except those in an m×n subblock of the M×N dequantized block, wherein m≤M and n≤N.

8. The method of claim 1, wherein the determining the order of the performing the horizontal and vertical transforms includes, for the reduced-complexity dequantized block with dimensions M×N and zero-out enabled for all coefficients except in an m×n subblock:
    based on M being greater than N, performing an M-point horizontal transform first, and then performing an N-point vertical transform second, or
    based on N being greater than M, performing an N-point vertical transform first, and then performing an M-point horizontal transform second,
    wherein m≤M and n≤N.

9. A method of decoding a coded bitstream composed of compressed video/image data performed by at least one processor, the method comprising:
    receiving the coded bitstream composed of the compressed video/image data;
    generating a dequantized block by a process including entropy decoding the coded bitstream, and dequantizing a block;
    determining whether at least one of a height (N) or a width (M) of the dequantized block is greater than or equal to a pre-defined threshold;
    obtaining a reduced-complexity dequantized block based on the dequantized block; and
    based on determining that the at least one of the height or the width of the dequantized block is greater than or equal to the pre-defined threshold: performing transform coding of the reduced-complexity dequantized block using a line graph transform (LGT) core to perform direct matrix multiplications for each of the horizontal and vertical dimensions of the reduced-complexity dequantized block,
    wherein the obtaining the reduced-complexity dequantized block includes: based on a secondary transform being enabled for the M×N dequantized block with zero-out also enabled and an input to the secondary transform being first K coefficients along a scanning order, zeroing-out all coefficients of the dequantized block outside of an m×n subblock of the dequantized block.

10. A method of decoding a coded bitstream composed of compressed video/image data performed by at least one processor, the method comprising:
    receiving the coded bitstream composed of the compressed video/image data;
    generating a dequantized block by a process including entropy decoding the coded bitstream and dequantizing a block;
    determining whether at least one of a height or a width of the dequantized block is greater than or equal to a pre-defined threshold;
    obtaining a reduced-complexity dequantized block based on the dequantized block; and
    based on determining that the at least one of the height or the width of the dequantized block is greater than or equal to the pre-defined threshold: performing transform coding of the reduced-complexity dequantized block using a line graph transform (LGT) core to perform direct matrix multiplications for each of the horizontal and vertical dimensions of the reduced-complexity dequantized block; and storing, in a memory, in advance, a pre-defined table that associates dequantized blocks of different block width and block height sizes (M×N) with subblocks of different subblock width and subblock height sizes (m×n), where all coefficients outside of the m×n region are zeroed-out.

11. The method of claim 1, wherein at least one of a block height or width of the dequantized block is greater than or equal to 32, and a block height and a width of the reduced-complexity dequantized block is 16×16.

12. The method of claim 1, wherein at least one of a block height or width of the dequantized block is greater than or equal to 64, and a block height and a width of the reduced-complexity dequantized block is 16×16.

13. A non-transitory computer-readable storage medium storing instructions that, when executed, cause a system or device comprising one or more processors to perform the method of claim 1.

14. An apparatus comprising:
at least one memory configured to store computer program code; and
at least one processor configured to access the at least one memory and operate according to the computer program code, the computer program code comprising:
receiving code configured to cause the at least one processor to receive a coded bitstream composed of compressed video/image data;
generating code configured to cause the at least one processor to generate a dequantized block by a process including entropy decoding the coded bitstream and dequantizing a block;
determining code configured to cause the at least one processor to determine whether at least one of a height or a width of the dequantized block is greater than or equal to a pre-defined threshold; and
reduced-complexity code configured to cause the at least one processor to: based on determining that the at least one of the height or the width of the dequantized block is greater than or equal to the pre-defined threshold: obtain a reduced-complexity dequantized block based on the dequantized block and perform transform coding of the reduced-complexity dequantized block using a line graph transform (LGT) core to perform direct matrix multiplications for each of the horizontal and vertical dimensions of the reduced-complexity dequantized block,
wherein the at least one memory stores, in advance, a pre-defined table that associates dequantized blocks of different block width and block height (M×N) sizes with subblocks of different width and subblock height (m×n) sizes.

15. The apparatus of claim 14, wherein
the reduced-complexity dequantized block is obtained by reducing the number of non-zero coefficients in the dequantized block by zeroing out all coefficients outside of an m×n region of the dequantized block based on the pre-defined table.

16. The apparatus of claim 14, further comprising:
a display, wherein the computer program code further comprises: display code configured to cause the at least one processor to: generate a displayable image based at least in part on the transformed reduced-complexity dequantized block; and perform control so that the displayable image is displayed by the display.

17. A method of coding image data performed by at least one processor, the method comprising:
receiving information regarding a data block of an image;
determining whether at least one of a height or a width of a residual coding block corresponding to the data block of the image is greater than or equal to a pre-defined threshold; and
based on determining that the at least one of the height or the width of the residual coding block is greater than or equal to the pre-defined threshold:
identifying or generating a reduced-complexity residual coding block by reducing the number of non-zero coefficients in the residual coding block; and
performing transform coding of the reduced-complexity residual coding block using a line graph transform (LGT) core to perform direct matrix multiplications for each of the horizontal and vertical dimensions of the reduced-complexity residual coding block,
wherein the performing the transform coding includes determining an order of performing horizontal and vertical transforms to the reduced-complexity residual coding block when zero-out is enabled on LGT, depending on a ratio of width to height (M/N) of the residual coding block.

18. The method of claim 17, wherein the pre-defined threshold has a value corresponding to one of: 32, 64, 128, or 256.

19. The method of claim 17, wherein the generating of the reduced-complexity residual coding block includes zeroing-out all coefficients except coefficients in an m×n subblock of the residual coding block, and the performing of the transform coding of the reduced-complexity residual coding block includes processing the m×n subblock of the residual coding block instead of processing the entire residual coding block.

* * * * *